(12) United States Patent
Robel et al.

(10) Patent No.: US 10,830,191 B1
(45) Date of Patent: Nov. 10, 2020

(54) TEMPERATURE MANAGEMENT OF AN AFTERTREATMENT SYSTEM DURING COMPRESSION BRAKING

(71) Applicant: Caterpillar Inc., Peoria, IL (US)

(72) Inventors: Wade Robel, Dunlap, IL (US); Spencer Huhn, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/544,757

(22) Filed: Aug. 19, 2019

(51) Int. Cl.
*F02M 26/52* (2016.01)
*F02D 13/04* (2006.01)
*F02M 26/00* (2016.01)

(52) U.S. Cl.
CPC ............ *F02M 26/52* (2016.02); *F02D 13/04* (2013.01); *F02M 2026/001* (2016.02); *F02M 2026/004* (2016.02)

(58) Field of Classification Search
CPC ............ F02M 26/52; F02M 2026/001; F02M 2026/004; F02D 13/04
See application file for complete search history.

(56) References Cited

U.S. PATENT DOCUMENTS

| | | | |
|---|---|---|---|
| 6,866,017 B2 | 3/2005 | Ruggiero et al. | |
| 6,868,824 B2 | 3/2005 | Yang et al. | |
| 9,593,619 B2* | 3/2017 | Zhang | F01N 13/009 |
| 10,578,035 B2* | 3/2020 | Schnorpfeil | F02D 41/025 |
| 2003/0178002 A1 | 9/2003 | Israel et al. | |
| 2013/0008417 A1 | 1/2013 | Sankar et al. | |
| 2018/0171907 A1 | 6/2018 | Ulrey et al. | |

FOREIGN PATENT DOCUMENTS

| | | |
|---|---|---|
| JP | 2017-31844 A | 2/2017 |
| JP | 2019-82121 A | 5/2019 |

* cited by examiner

*Primary Examiner* — Hieu T Vo
(74) *Attorney, Agent, or Firm* — Harrity & Harrity LLP

(57) ABSTRACT

A system is disclosed that may include a gas recirculation passageway configured to recirculate gas exiting an engine to an intake of the engine prior to the gas reaching an aftertreatment system associated with the engine. The system may include a valve configured to control a gas recirculation of the gas recirculation passageway. The system may include a controller configured to cause, during a compression braking procedure for the engine, actuation of the valve to produce the gas recirculation when the aftertreatment system is performing an operation that is temperature-dependent.

20 Claims, 3 Drawing Sheets

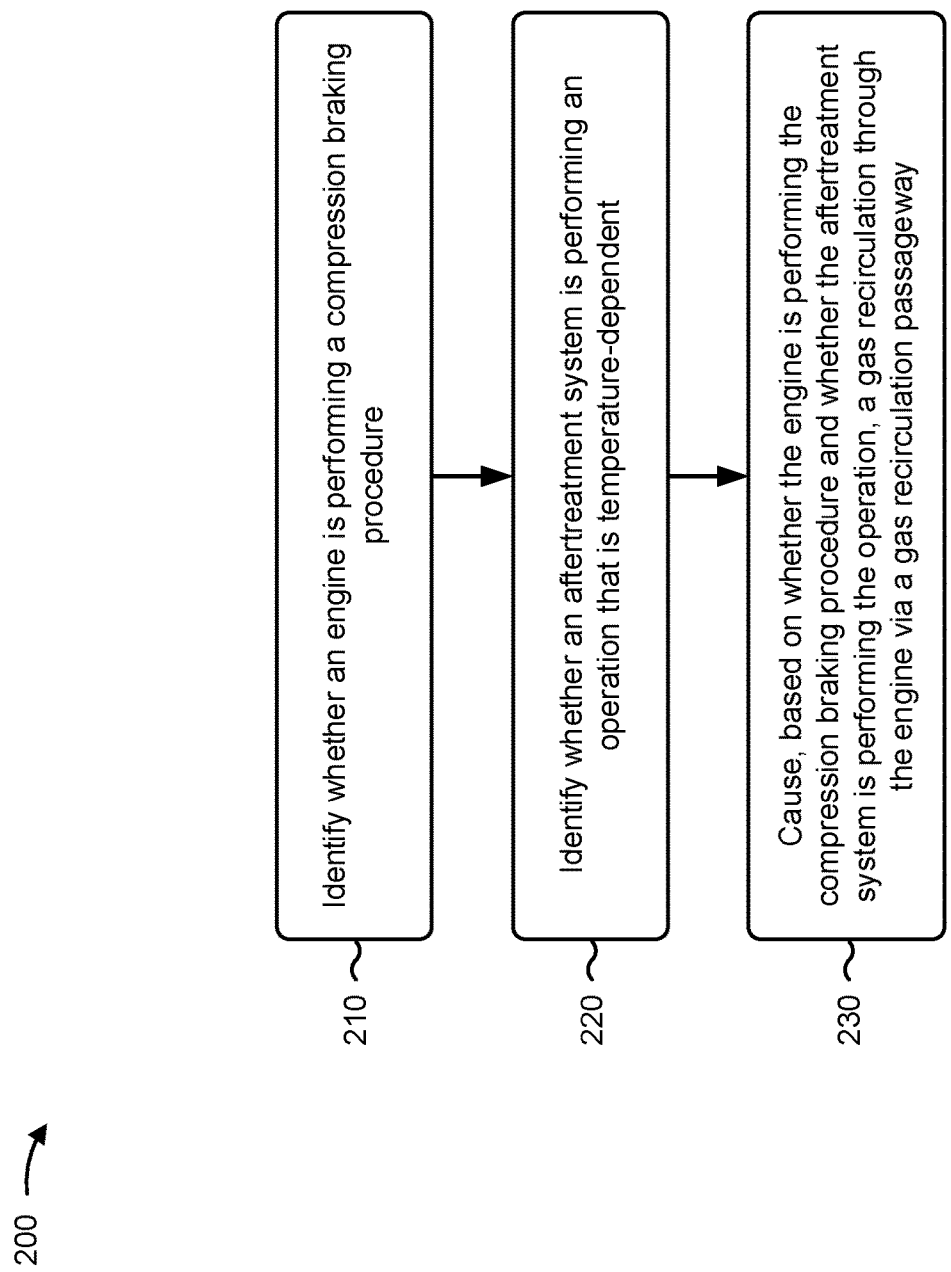

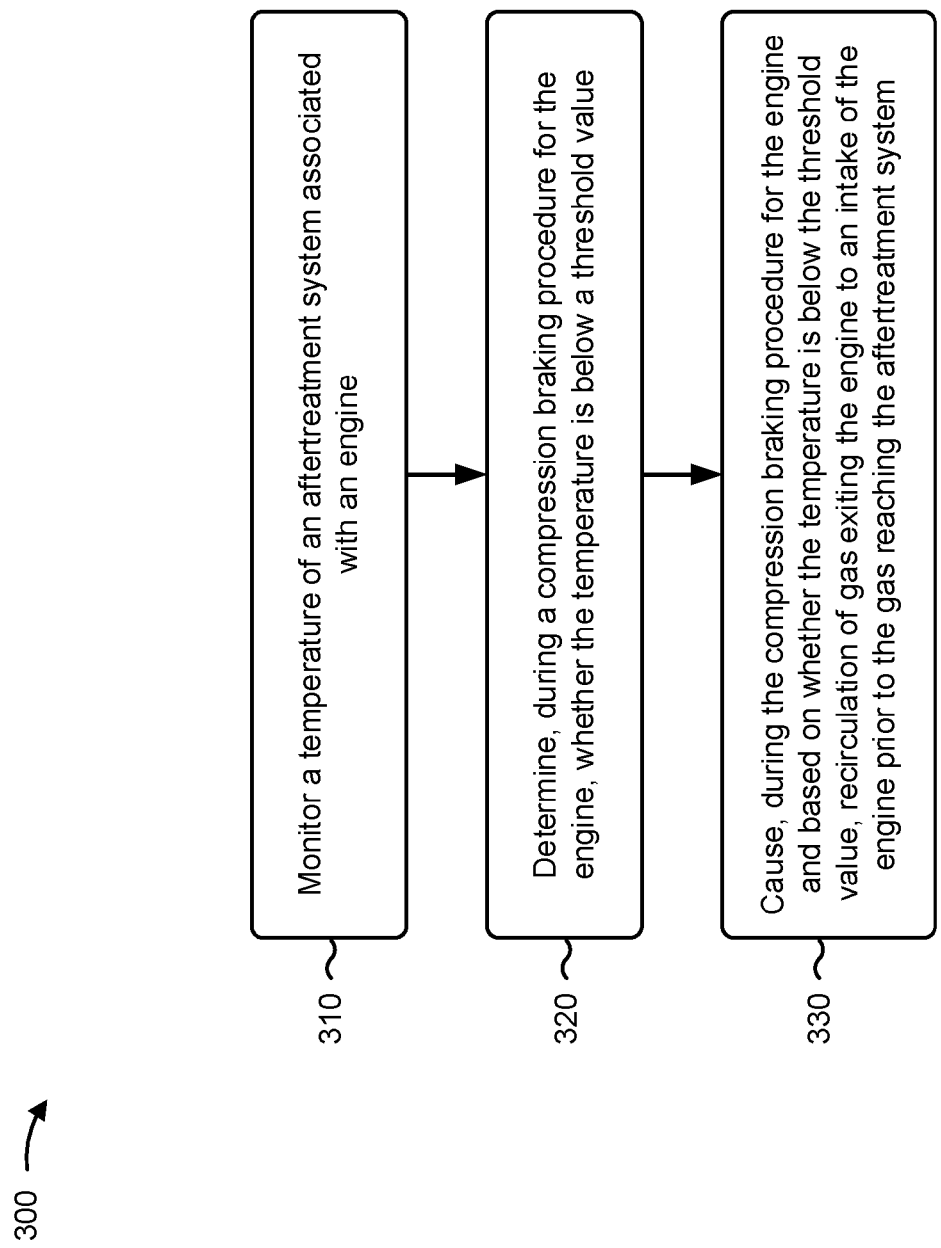

TEMPERATURE MANAGEMENT OF AN AFTERTREATMENT SYSTEM DURING COMPRESSION BRAKING

TECHNICAL FIELD

The present disclosure relates generally to a power system and, for example, to temperature management of an aftertreatment system during compression braking.

BACKGROUND

Internal combustion engines, such as diesel engines, produce exhaust gas that contains a variety of pollutants. These pollutants may include, for example, particulate matter (e.g., soot), nitrogen oxides (NOx), and sulfur compounds. In some cases, an engine may be associated with an exhaust aftertreatment system that reduces pollutants in exhaust gas prior to the release of the exhaust gas into the atmosphere.

Machines, such as vehicles, may operate an internal combustion engine (e.g., a diesel engine) to provide compression braking. For example, a machine may use compression braking during downhill operation of the machine to reduce wear to wheel brakes of the machine. During a compression braking procedure, gas in cylinders of the engine may be released to an exhaust system of the engine at the end of a compression stroke of the engine. Accordingly, energy stored in the compressed gas is not returned to the engine by combustion in a subsequent expansion stroke, and the uncombusted gas may have a relatively lower temperature when passing through an aftertreatment system of the exhaust system. As a result, temperature-dependent operations of the aftertreatment system may operate poorly during compression braking, thereby necessitating use of additional systems to heat the gas and/or the aftertreatment system.

One attempt to increase exhaust gas temperature is disclosed in Japan Patent Application Publication No. 2019082121 ("the '121 publication"). In particular, the '121 publication (according to one online translation) discloses closing an exhaust brake during an idle stop of an engine to give load resistance to the engine, thereby increasing the exhaust gas temperature. The '121 publication indicates that doing so enables engine warm-up from a cold start or regeneration of a particle filter during the idle stop.

While the procedure of the '121 publication may result in raising exhaust gas temperature at a cold start, or during idling, of an engine, the '121 publication is not concerned with increasing exhaust gas temperature during a compression braking procedure for the engine. Compression braking may cause an increased mass flow of relatively colder gas to an aftertreatment system associated with an engine, thereby impairing temperature-dependent operations of the aftertreatment system.

The power system of the present disclosure solves one or more of the problems set forth above and/or other problems in the art.

SUMMARY

According to some implementations, a system may include a gas recirculation passageway configured to recirculate gas exiting an engine to an intake of the engine prior to the gas reaching an aftertreatment system associated with the engine; a valve configured to control a gas recirculation of the gas recirculation passageway; and a controller configured to cause, during a compression braking procedure for the engine, actuation of the valve to produce the gas recirculation when the aftertreatment system is performing an operation that is temperature-dependent.

According to some implementations, a system may include an engine having an intake passageway and an exhaust passageway; an aftertreatment system located on the exhaust passageway; a gas recirculation passageway that provides a fluid connection between the exhaust passageway and the intake passageway, upstream of the aftertreatment system; and a controller configured to: identify whether the aftertreatment system is performing an operation that is temperature-dependent; and cause, based on whether the aftertreatment system is performing the operation, a gas recirculation through the engine via the gas recirculation passageway during a compression braking procedure for the engine.

According to some implementations, a method may include monitoring a temperature of an aftertreatment system associated with an engine; detecting whether the temperature is below a threshold value; and causing, during a compression braking procedure for the engine and based on whether the temperature is below the threshold value, recirculation of gas exiting the engine to an intake of the engine prior to the gas reaching the aftertreatment system.

BRIEF DESCRIPTION OF THE DRAWINGS

FIGS. 2 and 3 are diagrams of example processes for temperature management of an aftertreatment system during compression braking.

DETAILED DESCRIPTION

Figure 1:
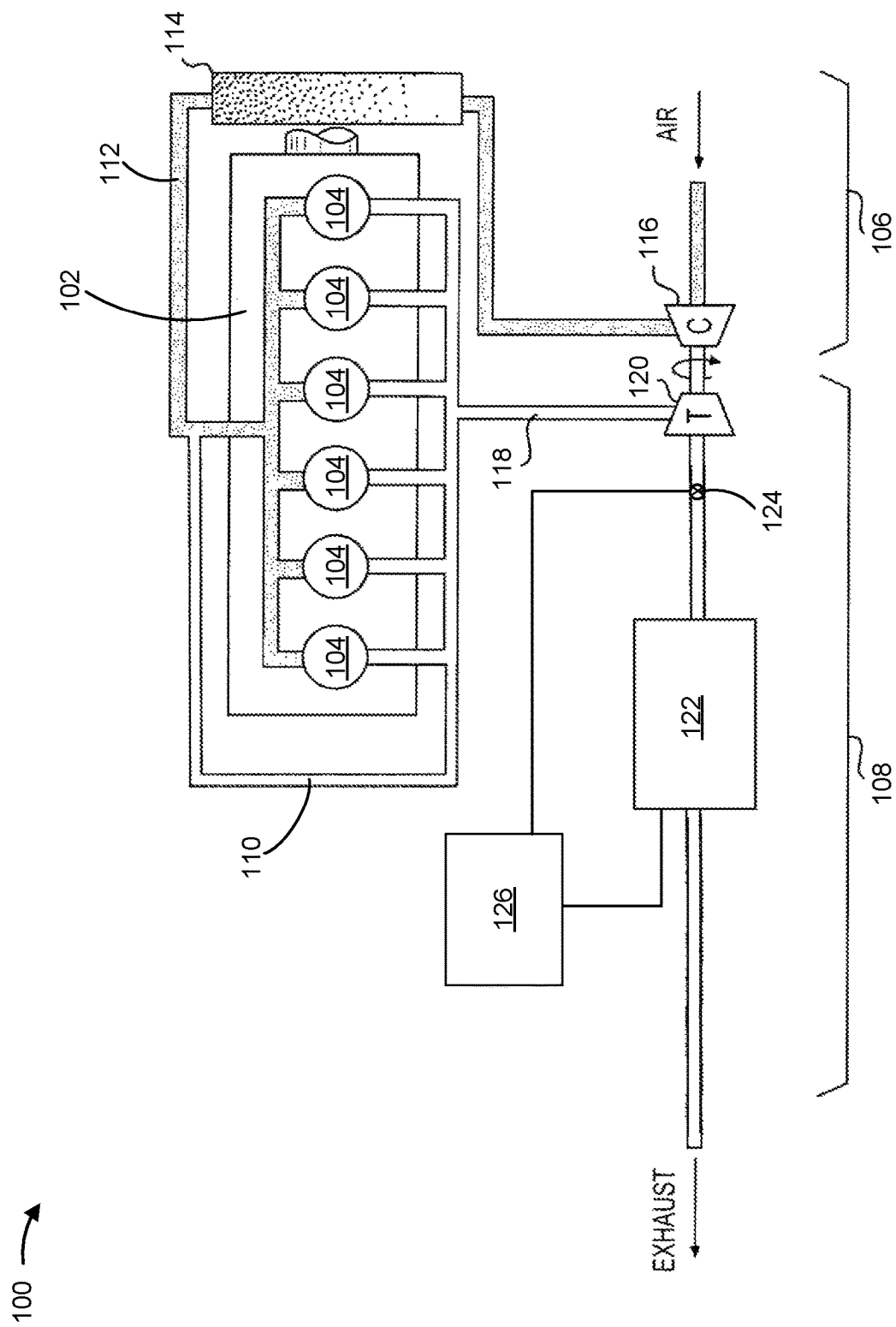
FIG. 1 is diagram of an example power system described herein.

This disclosure relates to a power system. The power system has universal applicability to any machine utilizing an internal combustion engine. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment.

FIG. 1 is a diagram of an example power system 100 described herein. As shown in FIG. 1, the power system 100 includes a diesel-fueled, internal combustion engine. However, the power system 100 may include any other type of internal combustion engine that may use compression braking.

The power system 100 may include an engine 102 that defines a plurality of cylinders 104, and a plurality of piston assemblies (not shown) disposed within the cylinders 104 to form combustion chambers. In some implementations, the cylinders 104 may be associated with one or more exhaust brakes (not shown). The power system 100 may include any quantity of combustion chambers (e.g., 16, 18, and/or the like), which may be disposed in an "in-line" configuration, a "V" configuration, or another type of configuration.

The power system 100 may include an air induction system 106, an exhaust system 108, and a gas recirculation passageway 110. The air induction system 106 may be configured to direct air, or an air and fuel mixture, into the engine 102 for combustion. For example, the air induction system may include an intake passageway 112 (e.g., an intake manifold) that provides a fluid connection between an air inlet and the cylinders 104. Thus, the intake passageway 112 may be configured to direct air, or an air and fuel mixture, to the cylinders 104. The air induction system 106 also may include a cooler 114 and a compressor 116 located on the intake passageway 112. The cooler 114 may cool air pressurized by the compressor 116.

The exhaust system 108 may be located downstream of the air induction system 106. The exhaust system 108 may be configured to direct exhaust gas resulting from combustion of the air in the engine 102 to the atmosphere. For example, the exhaust system 108 may include an exhaust passageway 118 (e.g., an exhaust manifold) configured to direct exhaust gas exiting the cylinders 104 to the atmosphere. The exhaust system 108 also may include a turbine 120 located on the exhaust passageway 118, which is driven by the exhaust gas in the exhaust passageway 118. The turbine 120 may be connected with, and drive, the compressor 116 to form a turbocharger (e.g., a variable-geometry turbocharger (VGT)).

In addition, the exhaust system 108 may include an aftertreatment system 122 located on the exhaust passageway 118 downstream of the turbine 120. The aftertreatment system 122 may include one or more aftertreatment components for processing exhaust gas. For example, the aftertreatment system 122 may include a diesel particulate filter (DPF), a selective catalytic reduction (SCR) device, a lean NOx trap (LNT), a diesel oxidation catalyst (DOC), an ammonia oxidation catalyst (AMOX), a heat source for regeneration of the DPF, and/or the like. Some operations performed by the aftertreatment system 122 may be temperature-dependent. For example, some operations performed by the aftertreatment system 122 may operate at a temperature that is greater than an atmospheric temperature. One such example is regeneration of a DPF, which may operate at a temperature greater than 150° C., 200° C., 250° C., and/or the like. Another example is NOx SCR, which may operate at a temperature greater than 175° C., 200° C., and/or the like.

The gas recirculation passageway 110 may provide exhaust gas recirculation (EGR). In such a case, the gas recirculation passageway 110 may be configured to direct a portion of the exhaust gas exiting the engine 102 to an intake of the engine 102. For example, the gas recirculation passageway 110 may provide a fluid connection between the intake passageway 112 and the exhaust passageway 118. The gas recirculation passageway 110 may be configured such that gas is recirculated upstream of the aftertreatment system 122. In other words, exhaust gas exiting the engine 102 is recirculated to the engine 102 via the gas recirculation passageway 110 prior to the gas reaching the aftertreatment system 122.

The gas recirculation passageway 110 may be associated with a valve 124 configured to control a pressure of the gas recirculation passageway 110. By controlling the pressure of the gas recirculation passageway 110, the valve 124 may control gas recirculation of the gas recirculation passageway 110. As shown in FIG. 1, the valve 124 may be located in the exhaust passageway 118 (i.e., downstream of the engine 102) such that a full or partial closure of the valve 124 may introduce backpressure in the exhaust passageway 118, thereby causing gas recirculation in the gas recirculation passageway 110. Additionally, or alternatively, backpressure may be generated by restricting exhaust gas flow through the turbine 120 (e.g., by increasing a restriction of air flow through the turbine 120). In some embodiments, a valve may be located in the intake passageway 112, such that a full or partial closure of the valve may reduce a pressure of air entering the engine 102, thereby causing gas recirculation in the gas recirculation passageway 110. Additionally, or alternatively, the pressure of air entering the engine 102 may be reduced by restricting air flow through the compressor 116 (e.g., by increasing a restriction of air flow through the compressor 116).

The power system 100 may also be associated with a controller 126 (e.g., an engine control module). The controller 126 may include one or more memories and one or more processors that store and process instructions for operation of the aftertreatment system 122, the valve 124, and/or the like. For example, the controller 126 may be configured to cause an operation of the aftertreatment system 122. As another example, the controller 126 may be configured to cause actuation of the valve 124 in order to produce gas recirculation via the gas recirculation passageway 110. Moreover, the controller 126 may be configured to provide control of a compression braking procedure for the engine 102. For example, the controller 126 may initiate the compression braking procedure upon detecting disengagement of an acceleration control, and/or engagement of a brake control, associated with a machine that includes the engine 102.

Accordingly, the controller 126 may identify whether the engine 102 is performing a compression braking procedure. Upon initiation of, or during, the compression braking procedure, the controller 126 may identify whether the aftertreatment system 122 is performing an operation that is temperature-dependent. For example, the controller 126 may identify whether the aftertreatment system 122 is performing a DPF regeneration operation (e.g., a passive or an active DPF regeneration operation) or an SCR operation. In some cases, the aftertreatment system 122 may be performing an operation that is temperature-dependent when the aftertreatment system 122 was performing the operation immediately prior to the compression braking procedure, and the aftertreatment system 122 will resume the operation immediately following the compression braking procedure. Based on identifying the operation, the controller 126 may, during the compression braking procedure, cause (e.g., by actuation of the valve 124) gas recirculation to the engine 102 via the gas recirculation passageway 110 (e.g., gas recirculation from the exhaust passageway 118 to the intake passageway 112). In other words, the controller 126 may cause the gas recirculation to the engine 102 prior to the gas reaching the aftertreatment system 122.

The controller 126 may cause the gas recirculation (e.g., by actuation of the valve 124) such that, during the compression braking procedure, a mass flow of gas to the aftertreatment system 122 during the gas recirculation is less than a mass flow of gas to the aftertreatment system 122 without the gas recirculation. Additionally, or alternatively, the controller 126 may cause the gas recirculation (e.g., by actuation of the valve 124) such that, during the compression braking procedure, a temperature of gas that flows to the aftertreatment system during the gas recirculation is greater than a temperature of gas that flows to the aftertreatment system without the gas recirculation.

In some cases, the controller 126 may monitor (e.g., using one or more sensors) a mass flow of gas to the aftertreatment system 122, a temperature of gas that flows to the aftertreatment system 122, and/or a temperature of the aftertreatment system 122. In such cases, the controller 126 may cause the gas recirculation (e.g., by actuation of the valve 124), during the compression braking procedure, further based on whether the mass flow satisfies a threshold value, the temperature of the gas satisfies a threshold value, and/or the temperature of the aftertreatment system 122 satisfies a threshold value. For example, the controller 126 may cause, during the compression braking procedure, the gas recirculation based on identifying that the aftertreatment system 122 is performing an operation that is temperature-dependent, and determining that the mass flow to the aftertreatment system 122 is above a threshold value, the temperature of the gas is below a threshold value, and/or the temperature of the aftertreatment system 122 is below a threshold value (e.g., a threshold value that is 300° C. or less, 250° C. or less, 200° C. or less, and/or the like).

In addition, the controller 126 may cause the gas recirculation (e.g., by actuation of the valve 124), during the compression braking procedure, such that the gas being recirculated is heated (e.g., by compression during the compression braking procedure). In such a case, the controller 126 may cause the gas recirculation such that the gas, when first exiting the engine 102 (i.e., prior to recirculation), has a first temperature, and the gas after the recirculation has a second temperature that is greater than the first temperature. The controller 126 may thereafter cause (e.g., by actuation of the valve 124) the heated gas to be directed to the aftertreatment system 122.

As indicated above, FIG. 1 is provided as an example. Other examples may differ from what is described in connection with FIG. 1.

FIG. 2 is a flow chart of an example process 200 for temperature management of an aftertreatment system during compression braking. One or more process blocks of FIG. 2 may be performed by a controller (e.g., controller 126). Additionally, or alternatively, one or more process blocks of FIG. 2 may be performed by another device or a group of devices separate from or including the controller.

As shown in FIG. 2, process 200 may include identifying whether an engine is performing a compression braking procedure (block 210). For example, the controller (e.g., using one or more processors, one or more memories, and/or the like) may identify whether an engine is performing a compression braking procedure, as described above.

As shown in FIG. 2, process 200 may include identifying whether an aftertreatment system is performing an operation that is temperature-dependent (block 220). For example, the controller (e.g., using one or more processors, one or more memories, and/or the like) may identify whether an aftertreatment system is performing an operation that is temperature-dependent, as described above.

As further shown in FIG. 2, process 200 may include causing, based on whether the engine is performing the compression braking procedure and whether the aftertreatment system is performing the operation, a gas recirculation through the engine via a gas recirculation passageway (block 230). For example, the controller (e.g., using one or more processors, one or more memories, and/or the like) may cause, based on whether the engine is performing the compression braking procedure and whether the aftertreatment system is performing the operation, a gas recirculation through the engine via a gas recirculation passageway, as described above.

Process 200 may include additional implementations, such as any single implementation or any combination of implementations described below and/or in connection with one or more other processes described elsewhere herein.

In some implementations, process 200 may further include identifying whether a mass flow of gas to the aftertreatment system is above a threshold value, and causing the gas recirculation based on whether the aftertreatment system is performing the operation and whether the mass flow of the gas is above the threshold value. The gas recirculation may be such that, during the compression braking procedure, a mass flow of gas to the aftertreatment system with the gas recirculation is less than a mass flow of gas to the aftertreatment system without the gas recirculation.

In addition, process 200 may further include identifying whether a temperature of gas that flows to the aftertreatment system is below a threshold value, and causing the gas recirculation may be based on whether the aftertreatment system is performing the operation and whether the temperature of the gas is below the threshold value. In some cases, causing the gas recirculation may be based on whether the aftertreatment system is performing the operation and whether a temperature of the aftertreatment system is below a threshold value. The gas recirculation may be such that, during the compression braking procedure, a temperature of gas that flows to the aftertreatment system with the gas recirculation is greater than a temperature of gas that flows to the aftertreatment system without the gas recirculation. Additionally, or alternatively, the gas recirculation may be such that, during the compression braking procedure, a temperature of the aftertreatment system during the gas recirculation is greater than a temperature of the aftertreatment system without the gas recirculation.

Causing the gas recirculation may be by actuation of a valve that is configured to control the gas recirculation. Moreover, the operation that is temperature-dependent may be an SCR operation.

Although FIG. 2 shows example blocks of process 200, in some implementations, process 200 may include additional blocks, fewer blocks, different blocks, or differently arranged blocks than those depicted in FIG. 2. Additionally, or alternatively, two or more of the blocks of process 200 may be performed in parallel.

FIG. 3 is a flow chart of an example process 300 for temperature management of an aftertreatment system during compression braking. One or more process blocks of FIG. 3 may be performed by a controller (e.g., controller 126). Additionally, or alternatively, one or more process blocks of FIG. 3 may be performed by another device or a group of devices separate from or including the controller.

As shown in FIG. 3, process 300 may include monitoring a temperature of an aftertreatment system associated with an engine (block 310). For example, the controller (e.g., using one or more processors, one or more memories, and/or the like) may monitor a temperature of an aftertreatment system associated with an engine, as described above.

As further shown in FIG. 3, process 300 may include determining, during a compression braking procedure for the engine, whether the temperature is below a threshold value (block 320). For example, the controller (e.g., using one or more processors, one or more memories, and/or the like) may determine, during a compression braking procedure for the engine, whether the temperature is below a threshold value, as described above.

As further shown in FIG. 3, process 300 may include causing, during the compression braking procedure for the engine and based on whether the temperature is below the threshold value, recirculation of gas exiting the engine to an intake of the engine prior to the gas reaching the aftertreatment system (block 330). For example, the controller (e.g., using one or more processors, one or more memories, and/or the like) may cause, during the compression braking procedure for the engine and based on whether the temperature is below the threshold value, recirculation of gas exiting the engine to an intake of the engine prior to the gas reaching the aftertreatment system, as described above.

Process 300 may include additional implementations, such as any single implementation or any combination of implementations described below and/or in connection with one or more other processes described elsewhere herein.

In some implementations, process 300 further may include causing heating of the gas during recirculation to obtain heated gas, and causing the heated gas to be directed to the aftertreatment system in order to heat the aftertreatment system. Accordingly, the gas, when exiting the engine, has a first temperature, and the gas, after recirculation, has a second temperature that is greater than the first temperature.

Recirculation of the gas may be performed via a gas recirculation passageway that provides a fluid connection between an exhaust passageway of the engine and an intake passageway of the engine. In addition, recirculation of the gas may be such that, during the compression braking procedure, a mass flow of gas to the aftertreatment system with recirculation is less than a mass flow of gas to the aftertreatment system without recirculation.

The aftertreatment system may be configured to perform an SCR operation. In some cases, the threshold value may be less than or equal to 200° C.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed power system may be used with any machine that utilizes an aftertreatment system to process exhaust gas of an internal combustion engine. The disclosed power system may provide temperature management of the aftertreatment system during compression braking. In particular, the power system may recirculate gas exiting the engine, prior to the gas reaching the aftertreatment system, in order to maintain, or increase, a temperature of the aftertreatment system during compression braking. In this way, the power system improves functioning of operations of the aftertreatment system that are temperature-dependent. Moreover, the power system may reduce, or eliminate, a need for additional components and/or resources (e.g., fuel) used to heat gas reaching the aftertreatment system and/or used to heat the aftertreatment system. In this way, the power system improves a useful life of such additional components and/or resources.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A system, comprising:
   a gas recirculation passageway configured to recirculate gas exiting an engine to an intake of the engine prior to the gas reaching an aftertreatment system associated with the engine;
   a valve configured to control a gas recirculation of the gas recirculation passageway; and
   a controller configured to cause, during a compression braking procedure for the engine, actuation of the valve to produce the gas recirculation when the aftertreatment system is performing an operation that is temperature-dependent.

2. The system of claim 1, wherein the controller is further configured to identify whether the aftertreatment system is performing the operation that is temperature-dependent.

3. The system of claim 1, wherein the operation that is temperature-dependent is a selective catalytic reduction operation.

4. The system of claim 1, wherein the controller, when causing actuation of the valve, is configured to:
   cause actuation of the valve such that, during the compression braking procedure, a mass flow of gas to the aftertreatment system with the gas recirculation is less than a mass flow of gas to the aftertreatment system without the gas recirculation.

5. The system of claim 1, wherein the controller, when causing actuation of the valve, is configured to:
   cause actuation of the valve such that, during the compression braking procedure, a temperature of the aftertreatment system during the gas recirculation is greater than a temperature of the aftertreatment system without the gas recirculation.

6. The system of claim 1, wherein the controller, when causing actuation of the valve, is configured to:
   cause actuation of the valve when the aftertreatment system is performing the operation and when a temperature of the aftertreatment system is below a threshold value.

7. A system, comprising:
   an engine having an intake passageway and an exhaust passageway;
   an aftertreatment system located on the exhaust passageway;
   a gas recirculation passageway that provides a fluid connection between the exhaust passageway and the intake passageway, upstream of the aftertreatment system; and
   a controller configured to:
      identify whether the engine is performing a compression braking procedure;
      identify whether the aftertreatment system is performing an operation that is temperature-dependent; and
      cause, based on whether the engine is performing the compression braking procedure and whether the aftertreatment system is performing the operation, a gas recirculation through the engine via the gas recirculation passageway.

8. The system of claim 7, wherein the operation that is temperature-dependent is a selective catalytic reduction operation.

9. The system of claim 7, wherein the controller is further configured to:
   identify whether a mass flow of gas to the aftertreatment system is above a threshold value, and
   wherein causing the gas recirculation is based on whether the aftertreatment system is performing the operation and whether the mass flow of the gas is above the threshold value.

10. The system of claim 7, wherein the controller, when causing the gas recirculation, is configured to:
    cause the gas recirculation such that, during the compression braking procedure, a mass flow of gas to the aftertreatment system with the gas recirculation is less than a mass flow of gas to the aftertreatment system without the gas recirculation.

11. The system of claim 7, wherein the controller is further configured to:
    identify whether a temperature of gas that flows to the aftertreatment system is below a threshold value, and
    wherein causing the gas recirculation is based on whether the aftertreatment system is performing the operation and whether the temperature of the gas is below the threshold value.

12. The system of claim 7, wherein the controller, when causing the gas recirculation, is configured to:
    cause the gas recirculation such that, during the compression braking procedure, a temperature of gas that flows to the aftertreatment system with the gas recirculation is greater than a temperature of gas that flows to the aftertreatment system without the gas recirculation.

13. The system of claim 7, wherein the controller, when causing the gas recirculation, is configured to:
    cause the gas recirculation by actuation of a valve that is configured to control the gas recirculation.

14. A method, comprising:
    monitoring a temperature of an aftertreatment system associated with an engine;
    determining, during a compression braking procedure for the engine, whether the temperature is below a threshold value; and
    causing, during the compression braking procedure for the engine and based on whether the temperature is below the threshold value, recirculation of gas exiting the engine to an intake of the engine prior to the gas reaching the aftertreatment system.

15. The method of claim 14, wherein the aftertreatment system is configured to perform a selective catalytic reduction operation.

16. The method of claim 14, wherein the threshold value is less than or equal to 200° C.

17. The method of claim 14, wherein the gas, when exiting the engine, has a first temperature, and
    wherein the gas, after recirculation, has a second temperature that is greater than the first temperature.

18. The method of claim 14, further comprising:
    causing heating of the gas during recirculation to obtain heated gas; and
    causing the heated gas to be directed to the aftertreatment system in order to heat the aftertreatment system.

19. The method of claim 14, wherein recirculation of the gas is performed via a gas recirculation passageway that provides a fluid connection between an exhaust passageway of the engine and an intake passageway of the engine.

20. The method of claim 14, wherein causing recirculation of the gas comprises: causing recirculation of the gas such that, during the compression braking procedure, a mass flow of gas to the aftertreatment system with recirculation is less than a mass flow of gas to the aftertreatment system without recirculation.

\* \* \* \* \*